March 5, 1968  D. K. CROWELL  3,371,724
POWER WEDGE
Filed Oct. 4, 1965  4 Sheets-Sheet 1
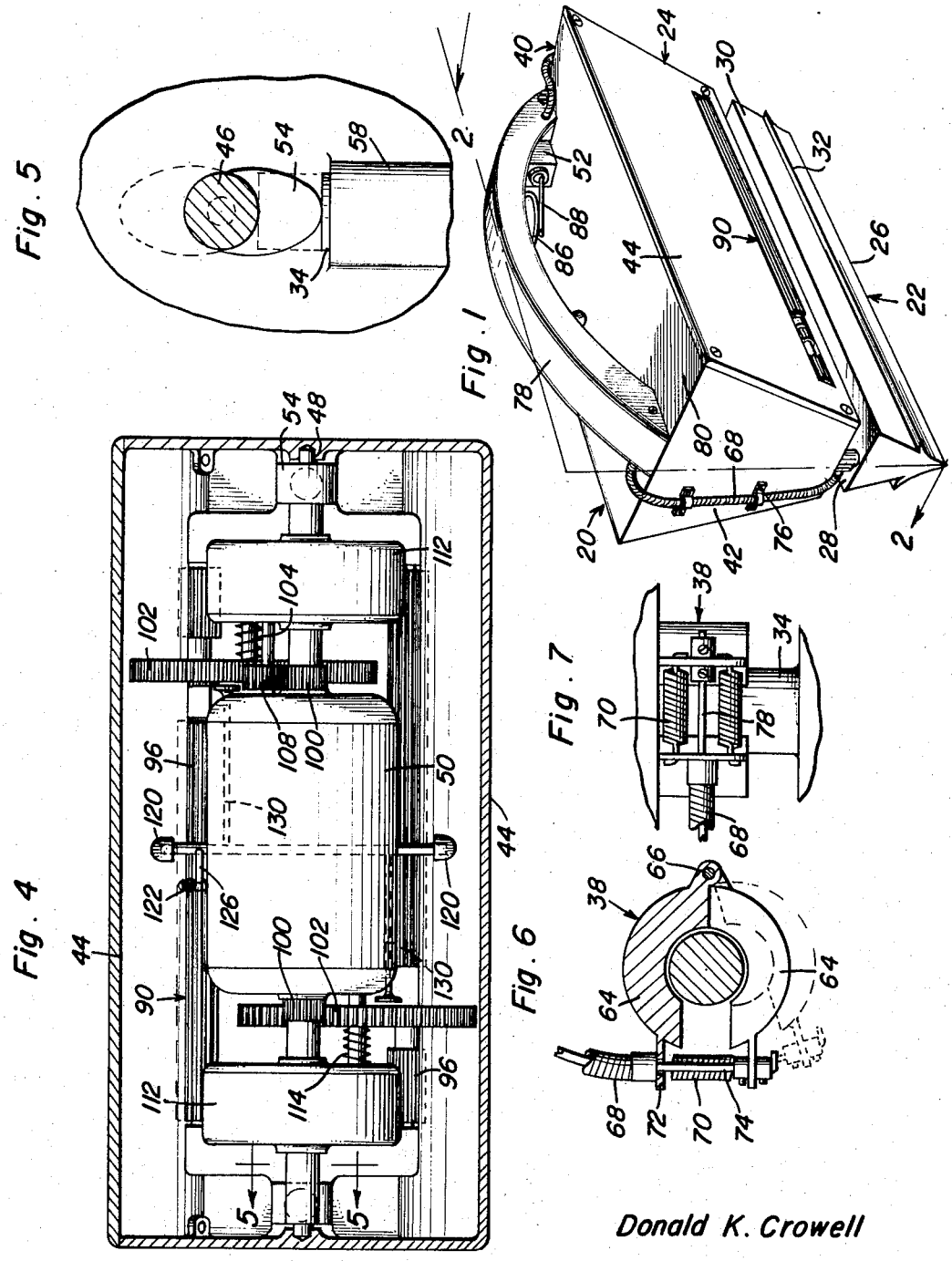
Donald K. Crowell
INVENTOR.

March 5, 1968     D. K. CROWELL     3,371,724
POWER WEDGE
Filed Oct. 4, 1965     4 Sheets-Sheet 2
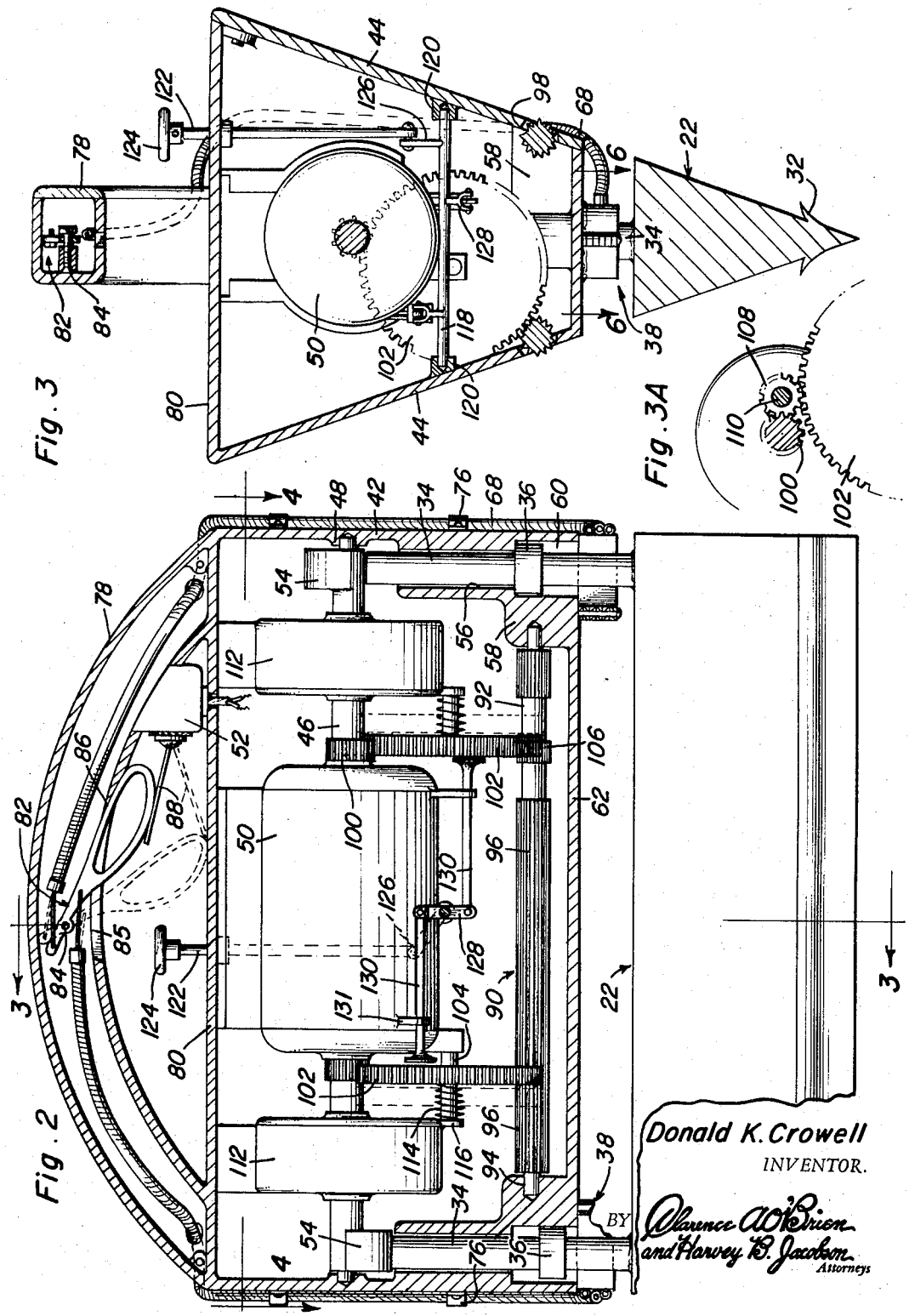
Donald K. Crowell
INVENTOR.

March 5, 1968  D. K. CROWELL  3,371,724
POWER WEDGE
Filed Oct. 4, 1965  4 Sheets-Sheet 3
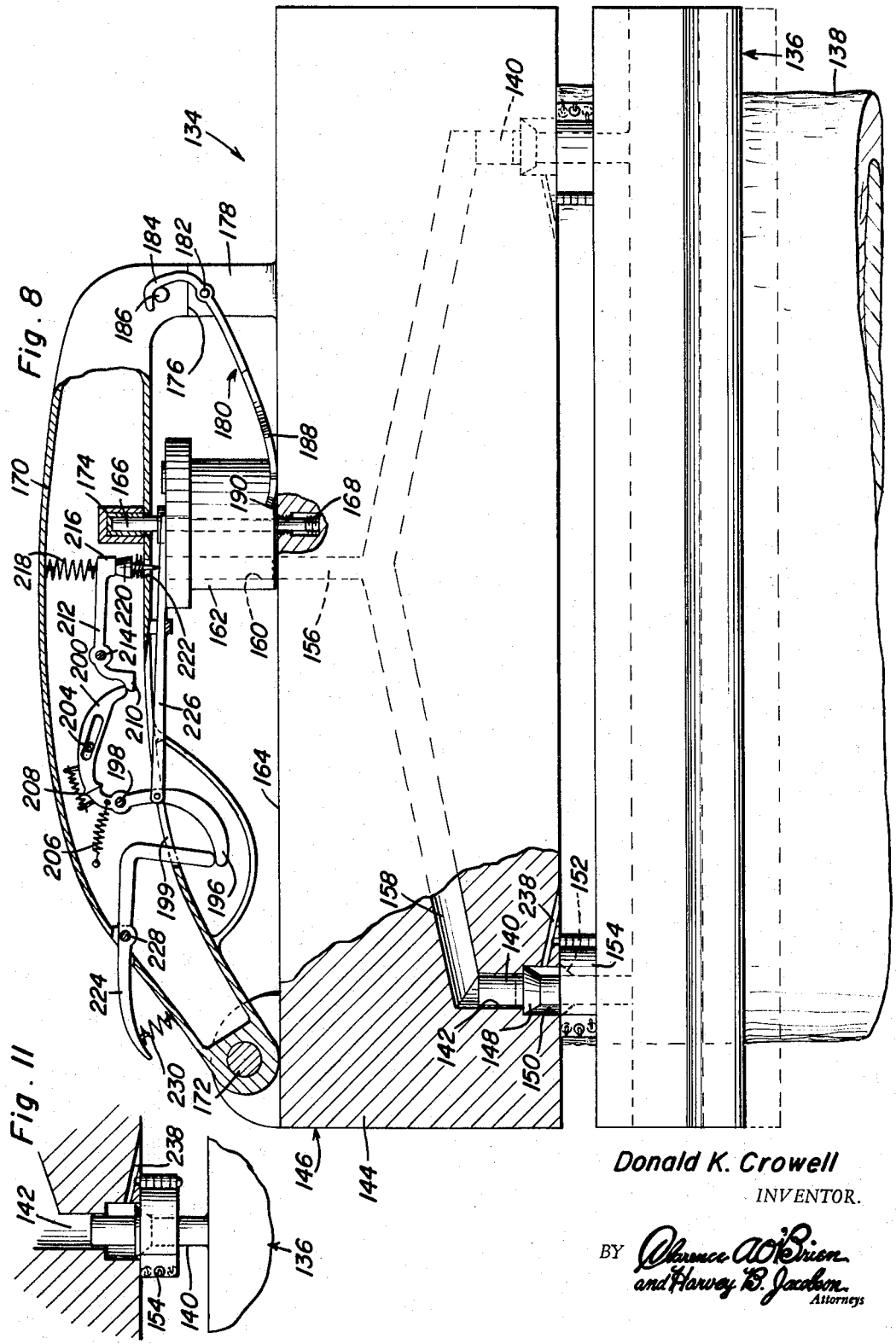
Donald K. Crowell
INVENTOR.

March 5, 1968     D. K. CROWELL     3,371,724

POWER WEDGE

Filed Oct. 4, 1965     4 Sheets-Sheet 4

Donald K. Crowell
INVENTOR.

BY *Clarence A. O'Brien*
*and Harvey B. Jacobson*
Attorneys

United States Patent Office 3,371,724
Patented Mar. 5, 1968

3,371,724
POWER WEDGE
Donald K. Crowell, 1967 San Gabriel St.,
San Bernardino, Calif. 92404
Filed Oct. 4, 1965, Ser. No. 492,657
16 Claims. (Cl. 173—123)

ABSTRACT OF THE DISCLOSURE

A triangular wedge element mounted on a drive unit which forms a continuation of the wedge shape of the element and which can be selectively power actuated so as to effect a driving of the wedge element into a workpiece for effecting a splitting of the workpiece. The entire tool, because of the shape thereof, advances into the wedge defined split so as to enable a continuous advance of the tool. The driving of the wedge-shaped element can be effected through the utilization of rotating cams or exploding cartridges.

---

The present invention relates to powered handtools, and is more specifically concerned with a device for mounting and driving a wedge element through an internal power source.

It is a primary object of the instant invention to provide a tool which can be utilized for a variety of tasks wherein a conventional wedge would be used, such as for example in splitting wood, with the tool of the instant invention being power driven so as to eliminate the physical effort normally associated with the driving of a wedge member or element.

In conjunction with the above object, it is also a significant object of the instant invention to provide a power wedge which is compact, positive acting, and capable of being easily handled and manipulated by the user due to the compact nature thereof.

Another significant object of the instant invention is to provide a driving unit for a wedge element which can utilize a variety of different power sources.

Furthermore, it is significant that the power wedge of the instant invention incorporate features which enable the accommodation of various situations which might tend to inhibit the efficiency of the device. For example, the device is to incorporate means for physically moving the entire unit into the progressively deepening split made by the driven wedge element, aside from the force of the user bearing thereagainst. In addition, the wedge element itself is to be easily detachable from the driving portion of the unit, directly from the handle itself, so as to enable the use of the same drive in conjunction with several wedge elements, this being particularly significant should one or more of the wedge elements become jammed.

Likewise, it is a significant object of the instant invention to incorporate safety features within the various forms of power wedge so as to protect the user and give the user instantaneous control over the operation of the wedge.

Basically, the device within which the above objects are considered to reside consists of an elongated triangular wedge element releasably connected to an elongated drive unit which is similarly shaped so as to define a smooth continuation of the wedge element, thereby functioning so as to progressively increase the split within which the element itself is to be driven. The drive unit is to contain a suitable source of power, for example, an electric motor or a blank cartridge discharging system, which will, in conjunction with an engagement of the wedge element with a workpiece, effect a reciprocation of the wedge element so as to produce the desired splitting action. The drive unit is to include a handle on the upper end thereof with the control mechanism therefor being readily accessible directly from the handle itself so as to allow the user to have instantaneous control over the operation of the device, this control including a complete disengagement of the wedge element from the drive unit. Further, the drive unit itself is to incorporate, within the side walls thereof, means which are power driven so as to progressively advance the entire wedge into the split being defined by the driven wedge element.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the power wedge comprising the instant invention;

FIGURE 2 is an enlarged cross-sectional view taken substantially on a plane passing along line 2—2 in FIGURE 1;

FIGURE 3 is a transverse cross-sectional view taken substantially on a plane passing along line 3—3 in FIGURE 2;

FIGURE 3a is a view detailing the right-hand gear arrangement in FIGURE 2;

FIGURE 4 is a horizontal cross-sectional view taken substantially on a plane passing along line 4—4 in FIGURE 2;

FIGURE 5 is an enlarged partial cross-sectional view taken substantially on a plane passing along line 5—5 in FIGURE 4;

FIGURE 6 is an enlarged sectional detail taken substantially on a plane passing along line 6—6 in FIGURE 3;

FIGURE 7 is an elevational detail illustrating the wedge element release means;

FIGURE 8 is a side elevational view, with portions broken away, illustrating a modified form of power wedge utilizing blank cartridges;

FIGURE 11 is a sectional detail illustrating the sliding movement of a wedge element mounting stud.

Figure 9:
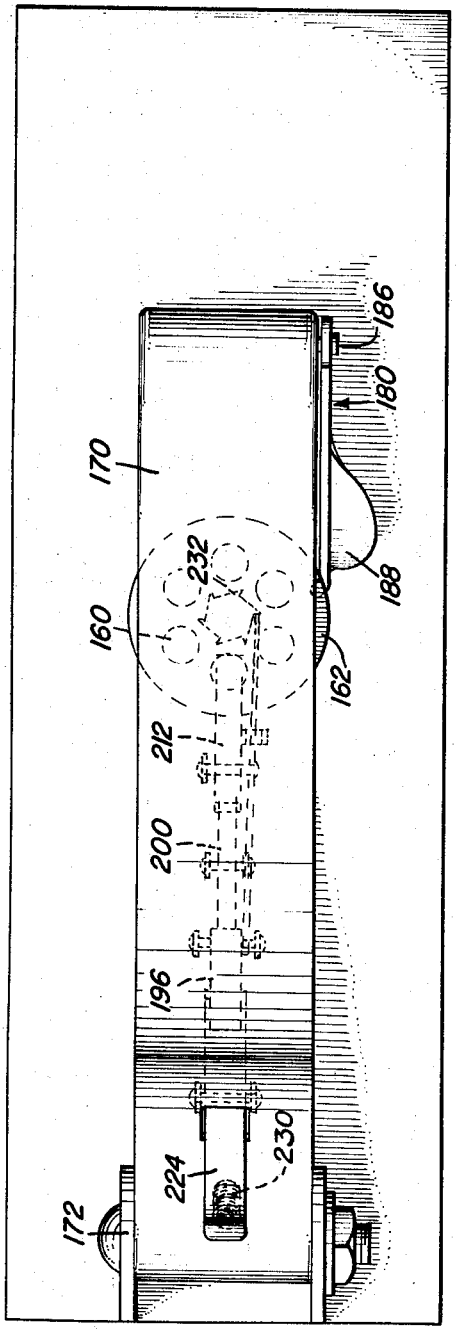
FIGURE 9 is a top plan view of the modified form of power wedge.

Referring now more specifically to the drawings, and in particular the form of the invention illustrated in FIGURES 1-7, reference numeral 20 is used to generally designate the power wedge device comprising the instant invention. This device 20 consists basically of an elongated wedge element 22 and a drive unit 24 which receives and controls the wedge element 22 in a manner which shall be described subsequently.

The wedge element 22 is triangular in cross section so as to define an elongated leading edge 26 and a flat following end or base 28. The converging sides 30 of the wedge element 22 are provided with outwardly directed barb-like ribs 32 along the full length thereof, these ribs 32 acting so as to retain the wedge element 22 within a member being split and resisting any tendency for the wedge element 22 to bounce rearwardly or out of the split. This function will become more apparent following the description of the operation of the device 20.

The mounting of the wedge element 22 on the driving or drive unit 24 is effected through a pair of upwardly projecting elongated cylindrical studs 34 rigidly affixed to the element base 28 adjacent the opposite ends thereof and along the longitudinal centerline. In addition, each of the studs 34 includes an integral annular limit ring 36 centrally thereon which cooperates with a split ring collar 38 on the drive unit 24 so as to selectively retain the studs 34.

The drive unit 24 includes an elongated housing 40 which, in cross section, is in the nature of an inverted truncated triangle so as to have the vertical end walls 42 and inclined side walls 44 constitute continuations of the end and side walls of the wedge element 22, this relationship between the configuration of the wedge element 22 and drive unit housing 40 being readily appreciated from FIGURES 1 and 3.

Extending longitudinally through the center of the hollow drive unit housing 40 is an elongated drive shaft 46, the opposite ends of which are rotatably mounted in any suitable manner within end wall sockets 48 which may incorporate roller bearings if desired. This shaft 46 is rotatably driven by a centrally located motor 50 which can be of any suitable type, the particular motor illustrated in the drawings being an electric motor controlled from a suitable switch box 52 and of course having a suitable power conductor extending therefrom to a conventional source of electric power, such conductor not being specifically illustrated in the drawings.

Fixed to the shaft 46 adjacent each of the bearing supported ends thereof is a radially extending cam or cam lobe 54, these lobes 54 being oppositely directed and constituting generally elliptical continuations of the shaft 46 itself as will be best appreciated from FIGURE 5. It is through these cams 54 that the actual driving of the wedge element 22 is effected. With specific reference to FIGURE 2, it will be noted that the element studs 34 are received within internal passages 56 extending into solid mounting portions 58 within the interior of the drive unit housing 40. The lower portions of the passages 56 are enlarged as at 60 so as to accommodate movement of the limiting rings 36 thereinto through the flat bottom 62 of the drive unit 24. The relationship between the length of the stud 34, the positioning of the limiting rings 36 associated therewith, and the length of the enlarged passage portions 60 is such so that the upper end of the stud 34, in the innermost position thereof, engages against the shaft 46 diametrically opposed from the corresponding cam 54 as illustrated in conjunction with the right-hand stud 34 in FIGURE 2. In addition, with reference to the left-hand stud 34 in FIGURE 2, it will be noted that the outermost driving position of the stud 34 positions the limiting ring 36 within the enlarged passage portion 60 at a point at or above the bottom 62, with the upper end of the stud 34 being located just above the passage 56 so as to receive the full effect of the downwardly extending cam 54 engaged thereagainst. It will be appreciated that by extending the two cams 54 in diametrically opposite directions, the opposite ends of the wedge element 22 will be driven sequentially, thereby facilitating the working of the wedge element 22 into a split. It will of course be appreciated that some degree of lateral play of the studs 34 within the passages 56 will be necessary to accommodate this movement. As an obvious modification of this arrangement of cams 54, it will be recognized that both cams can project in the same direction from the shaft 46 so as to effect a simultaneous unidirectional movement of the entire wedge element 22. Further, while it is contemplated that the weight of the drive unit 24 in conjunction with the force of the user bearing thereagainst will be sufficient so as to produce the desired relative retraction of the studs 34 into the housing as the corresponding cam 54 moves upwardly away therefrom, suitable spring means, not shown, can also be provided for maintaining intimate contact with the inner ends of the studs 34 and the elliptical configuration defined by the cam and shaft surface.

Each of the studs 34 is retained within the corresponding drive unit passage 56 by means of the split collars 38. Each split collar has the two half sections 64 thereof hingedly engaged with each other by a pin 66 which in turn mounts these two sections 64 to the bottom 62 of the housing 40 adjacent the lower entrance to the corresponding enlarged portion 60 of the passage 56. The opening and closing of the sections 38 controlled by an elongated Bowden cable 68 which acts so as to pivotally open the sections 64 against soiled tension springs 70 engaged between parallel outwardly projecting ears 72, one on each section 64 adjacent the free end thereof, the unsheathed end 74 of the cable 68 extending through one ear 72 and being fixed to the second ear 72 in the manner best illustrated in FIGURES 6 and 7. The split collar 38, which of course must be of substantial structural rigidity, in its open position is sufficient so as to accommodate passage of the corresponding stud ring 36 therethrough, with the collar 38 in its closed position preventing passage of the stud ring 36. In this manner, in order to insert the studs 34 within the housing sockets or passages 56, a push is exerted on the control wire of each cable 68 so as to pivotally open the split collars 38 allowing passage of the studs 34 and the rings 36 thereon. After passage of the rings 36 into the enlarged passage portions 60, the control wire of each of the Bowden cables is released or pulled so as to effect a closing of the collars 38, thereby locking the studs 34 within the passages 56 for vertical movement limited by engagement of the limit rings 36 with the upper end of the enlarged passage portion 60 and the tops of the split collars 38, each of the split collars 38 being retained closed by the tension springs 70 associated therewith. It will of course be appreciated that the collars 38, when closed, define a passage therethrough which while too small to allow passage of the corresponding stud rings 36, does allow free movement of the studs 34 therethrough. The Bowden cable 68 for each of the split collars 38 extends upwardly along the corresponding end wall 42, being suitably clamped thereto by brackets 76, and passes into the hollow interior of an elongated curving handle 78 secured to the opposite ends of the top 80 of the drive unit housing 40. The upper ends of the control wires of the two cables 68 are pivotally fixed to an elongated control lever 82 which is vertically orientated within the hollow handle 78 and pivotally mounted therein by a suitable pivot pin 84 located between the points of engagement of the two control wire ends in a manner so as to effect a simultaneous extension or retraction of both Bowden cable wires upon a pivoting of the lever 82, this in turn resulting in a simultaneous closing or opening of the locking split collars 38. The control of the lever 82 is effected through an integral elongated loop handle portion 86 thereon which extends outwardly through an elongated opening 85 in the under portion of the handle 78 for manipulation by the fingers of the hand or hands gripping the handle 78. In actual use, it is contemplated that the collars 38 be closed or locked upon a movement of the lever loop handle 86 upwardly toward the main power wedge handle 78 as illustrated in solid lines in FIGURE 2, with the release of the split collars 38 being effected by a movement of the loop handle 86 downwardly toward the top 80 of the drive unit housing 40, as illustrated in phantom lines in FIGURE 2. Further, as a safety feature, it will be noted that the switch unit 52 is controlled by an elongated switch lever 88 which projects outwardly below and in engagement with the loop handle 86, this switch lever 88, in its up position, turning the switch on and energizing the motor 50, and in its lower position, illustrated in phantom lines in FIGURE 2, shutting the switch unit 52 and de-energizing the motor 50. By extending the lever 88 beneath the loop handle 86, it will be recognized that the motor 50 can only be energized when the loop handle is in its upper position positively closing the locking collars 38, with any movement of the loop handle 86 downwardly so as to release the wedge element 22 through an opening of the split collars 38 automatically moving the switch lever 88 downwardly so as to de-energize the motor 50 and stop the driving of the unit.

In order to facilitate the movement of the entire power wedge 20 into a split in, for example, a length of wood, advancing rollers 90 are provided, one along each side of the drive unit 24. Each of the advancing rollers 90 consists of an elongated shaft 92 having the opposite ends 94 thereof rotatably supported within the enlarged mounting portions 58, suitable roller bearings being provided as desired. The actual gripping of the sides of the split being defined by the wedge element 22 is effected by enlarged cylindrical portions 96 having longitudinal gripping teeth or ribs thereon, these portions 96 being spaced along each of the shafts 92 and generally consisting of an elongated central portion and one relatively shorter end portion. With reference to FIGURES 1 and 3, it will be noted that the cylindrical gripping portions 96 have the peripheral ribbed surfaces thereof projecting outwardly beyond the side walls 44 of the housing 40 through elongated slots 98 therein. Thus, as the wedge element 22 is being driven into a workpiece, the rotating of the gripping roller portions 96 tends to simultaneously advance the entire unit 20. The driving of the advancing rollers 90 is effected directly from the drive shaft 46 through spur gears 100 fixed to the shaft 46 for rotation therewith and meshingly engaged with, in each instance, an enlarged gear 102 which is slidably and rotatably mounted on a corresponding shaft 104 and which similarly meshes with a spur gear 106 fixed to one of the roller shafs 92. As will be best appreciated from FIGURE 4, one of the spur gears 100, in this instance the right-hand spur gear, is actually engaged with the corresponding gear 102 through an intermediate idler gear 108 rotatably mounted on a transverse shaft 110 fixed between the adjoining housing of the motor 50 and one of the two speed change gear units 112 mounted on the opposite portions of the shaft 46 inward of the camming lobes 54. In this manner, the advancing rollers 90 will be driven in opposite directions, thereby cooperating so as to simultaneously advance both sides of the unit 20 into the split to be formed by the hammered wedge element 22. It will of course be appreciated that both gears 102 are of the same size as is the spur gears 100 and the idler gear 108, thereby maintaining the speed of the two advancing rollers 90 equal. FIGURE 3a details the positioning of the single idler gear 108 between the corresponding spur gear 100 and the enlarged gear 102. Further, it will be appreciated that the idler roller engaged gear 102 will have to sit slightly lower within the housing chamber so as to avoid engagement with the shaft mounted spur gear 100, however, this will in no way interfere with the operation of the device or effect the simultaneous driving of the two advancing rollers 90.

Both of the gears 102 are biased into meshing engagement with their associated gears by means of a coiled compression spring 114 engaged between the corresponding gear 102 and a shaft mounting ear or lug 116 depending from the adjoining speed change gear unit 112. In this manner, the gears 102 can be selectively disengaged so as to prevent a driving of the advancing rollers 90 and in fact allow for a free rotation of these rollers in either direction.

The mechanism by which the enlarged gears 102 are moved out of driving engagement with their associated gears includes an elongated rod 118 extending transversely across the housing 40 below the motor unit 50 with the opposite ends thereof rotatably engaged within suitable bosses 120 on the inner faces of the side walls 44. The rotation of this rod 118 is controlled through a vertically extending plunger 122 which projects through the top 80 of the housing 40 and is provided with a push-pull handle 124 on the upper end thereof. The lower end of the plunger 122 is pivotally engaged with a lug 126 which is fixed to the rod 118 and extends therefrom at approximately a 45° angle. In addition, a pair of lugs 128 are also fixed to the rod 118 and project vertically therefrom, one up and one down, each in general alignment with a central portion of one of the gears 102. The actual engagement with each of the gears 102 is effected by an elongated rigid link 130 having a first end thereof pivotally engaged with the outer end of the corresponding lug 128 and the other end thereof positioned juxtaposed the side face of the corresponding gear 102. In this manner, it will be appreciated that as the plunger 122 is depressed, referring to FIGURE 2, the rod 118 will rotate counterclockwise and exert an outward push on both of the gears 102 against their corresponding biasing springs 114 so as to disengage this gear and halt the driving of the opposed advancing rollers 90. Upon a release of the plunger handle 124, the springs 114 will immediately re-engage the gears 102 and simultaneously return the plunger 122 to its upper position. Suitable guides 131 can be provided for supporting the links 130 as needed.

In use, an appropriate wedge element is first mounted in the drive unit 24 by opening the split retaining collars 38 through a depression of the loop handle 86, this simultaneously ensuring a de-energization of the drive unit. After the wedge element studs 34 have been positioned, the collars are locked through both a movement of the handle 86 and the biasing force of the springs 70, and the device is ready for operation. The leading edge 26 of the wedge element 22 is positioned upon a member to be split and the drive unit activated by a raising of the switch lever 88. As the wedge element penetrates the workpiece and the housing 40 of the drive unit aproachs the split, the advancing rollers 90 will engage with the sides of the split and aid in the continued movement of the device 20 into the split. When it becomes necesary to retract the device 20, the advancing rollers are deactivated so as to form in effect free rolling members. Further, if for any reason it becomes necessary to leave the wedge element within the split, the drive unit can be simply disengaged by a depression of the handle 86 which will effect an opening of the split retaining collars 38, thus allowing use of the same drive unit 24 on a second wedge element for any purpose such as enlarging or extending the initial split in the workpiece.

While not specifically mentioned supra, it is contemplated that one of the sides 44 of the housing 40 be removably fixed into position so as to enable ready access to the interior of the drive unit for servicing. In addition, wing-like extensions can be provided so as to define upwardly angled continuations of the side walls 44 so as to continue the split widening surface available and also so as to provide protective side walls for the hand or hands of the operator. Also, by providing duplicate controls, it is contemplated that the advancing rollers can be made independently engageable and disengageable, this being desirable as a means for controlling the direction of movement of the wedge element 22. Likewise, while it is specifically contemplated that a wedge element of the type indicated by reference numeral 22 be used, the drive unit 24 can also incorporate a suitable driving head for, for example, post setting. As will be appreciated, the speed change gear units 112 enable as establishment of differences in the rotational speed of the advancing rollers 90 and the stud contacting cams 54.

Referring now particularly to FIGURES 8-11, it will be noted that a modified form of power wedge 134 has been illustrated therein, this form contemplating the utilization of exploding cartridges as the impelling force for the driving of the wedge element 136 into the workpiece 138. As was the case with the wedge element 22, the wedge element 136 includes a pair of mounting studs or driver posts 140 rigid therewith and projecting vertically therefrom for reception within a pair of internal passages 142 defined within the solid body 144 of the driver unit 146. In adition, the studs 140 are provided with limiting rings 148 received within the passage enlargements 150, each ring including a bevelled lower seating surface for selectively seating within a similarly formed depression 152 defined by the corresponding locking collar 154. These collars may be of the same form as and operated in the same manner as the aforedescribed collars 38, such collars having been illustrated in FIGURES 8 and 11 without a specific incorporation of the control cables therefor.

Both of the passages 142 are communicated with a central bore 156 by laterally directed passages 158, with the bore in turn communicating with selectively aligned cartridge chambers 160 within a revolving cylinder 162 mounted on the flat top 164 of the drive unit 146. The cartridge cylinder 162 is mounted by means of a vertical stem 166 which extends through the cylinder 162 and is engaged with the body 144 by screwing the threaded lower end 168 thereof through a threaded passage and into a slightly enlarged internal chamber. In this manner, any accidental release of the stem 166, and thereby the cylinder, is prevented.

The actual firing of the cartridges located within the cylinder 162 is effected through a mechanism located within an elongated hollow handle 170 positioned longitudinally over the top 164 of the body 154 and hingedly engaged at one end thereof, as at 172, for movement toward and away from overlying relation to the cylinder 162. It will be noted that a recessed socket portion 174 is provided within the undersurface of the handle 170 for receiving and stabilizing the upper end of the stem 166 with the free end 176 of the handle 170, in its closed position, resting on a vertically projecting pedestal 178. In order to selectively lock the handle 170 in its closed position, an elongated lever 180 is pivotally engaged, as at 182, to the upper end of the pedestal 178 for pivotal movement of a hooked or curved forward end 184 thereof into overlying relation to a laterally projecting pin 186 on the leading end portion of the handle 170. Movement of the lever 180 is controlled by a rearwardly extending enlarged handle portion 188 which in turn includes an upwardly curved lip 190. This lip 190 is deemed particularly significant in that it selectively engages within notches 192 provided about the undersurface of the enlarged head 194 of the cylinder 162 when the handle portion 188 is pivoted upwardly so as to release the handle 170. In this manner, rotation of the cylinder 162 is prevented whenever the handle 170 is released or opened, thereby preventing any accidental movement of the cylinder 162 so as to position and fire a live cartridge.

The actual firing of the cartridges, the discharge pressure of which traverses the bore 156, the lateral passages 158 and the stud receiving passages 142, is effected through movement of a trigger 196 which is mounted by pivot pin 198 within the hollow interior of the handle 170 and has the gripping portion projecting therebelow through an enlarged handle opening 199. The inner or leading end of the trigger 196, above the pivot pin 198, abuts against an elongated link 200 which is slidably and pivotally mounted on pin 204. A first coiled tension spring 206 is provided between the leading portion of the trigger 196 and a point rearwardly thereof so as to bias the trigger into the at rest position indicated in FIGURE 8, while a second coiled tension spring 208 is engaged between projecting ears on the adjacent end portions of the trigger 196 and link 200 so as to resiliently maintain these members in abutting engagement with each other. The leading or forward end of the link 200 is slidably engaged with a step portion 210 on a pivoted lever 212, mounted by a pivot pin 214, which in turn has the forward hammer defining end 216 thereof biased downwardly by coiled compression spring 218 into engagement with the upper end of the firing pin 220. The firing pin 220 is in turn biased upwardly against the hammer end 216 so as to be retracted from the cylinder chamber 160 immediately therebelow, a suitable aperture 222 of course being provided in the lower surface of the handle 170 for passage of the firing pin 220. FIGURE 8 illustrates the at rest position of all of these elements, in conjunction with a safety lever 224 and a cylinder advancing link 226. The safety lever 224 is pivotally pinned as at 228 to the handle 170 and has one end thereof projecting through the handle and into engagement with the outer end portion of the trigger 196 in a manner so as to tend to prevent the firing movement of the trigger 196, while the opposite or rear end of the lever 224 projects outwardly beyond the upper portion of the handle 170 and is biased by coiled compression spring 230 so as to provide a firm engagement of the leading end of the lever 224 with the trigger 196. In this manner, in order for the trigger 196 to be properly and easily operated, it is necessary to pivot the safety lever 224 upwardly and out of engagement with the trigger 196. This can only properly be done by the user of the device firmly gripping the handle 170 and compressing the far end portion of the lever 224 against the resistive force of the spring 230. Once this has been done, the trigger 196 can be easily actuated with a finger.

Figure 10:
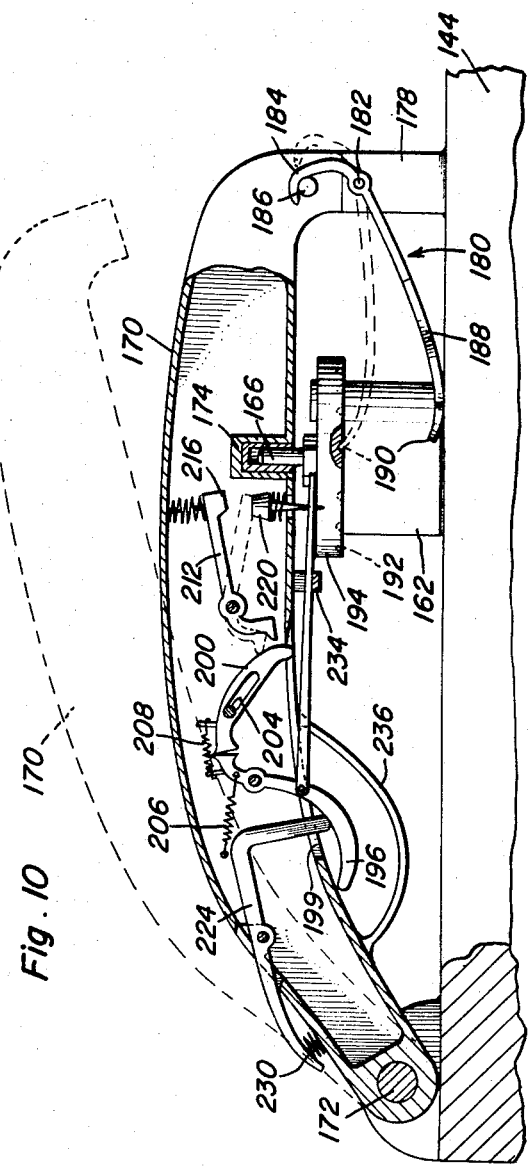
FIGURE 10 is a partial sectional view through the handle portion of the modification of FIGURE 8 illustrating the movement of the various elements during the firing sequence.

Referring specifically to FIGURE 10, the movement sequence of the above elements will be appreciated. Initially, the safety lever 224 is depressed so as to allow the trigger 196 to be pulled. Upon pulling the trigger 196, the link 200 is pushed forward and pivoted downwardly so as to, through the bearing engagement with the stepped portion 210, effect an upward pivoting of the hammer portion 216 against the spring 218. Finally, as the combination pivoting and sliding movement of the link 200 continues, the leading end thereof slides off the stepped portion 210, freeing the lever 212 for a downward driving of the hammer portion 216 by the spring 218 into driving engagement with the firing pin 220 which in turn is forcibly extended through the upper end of the cylinder 162 and into firing engagement with the cartridge aligned therewith. Upon a release of the trigger 196, the springs 206 and 208 return the trigger 196 and the link 200 to their original positions with the spring 208 allowing the necessary combination pivoting and rearward sliding movement of the link 200 so as to clear the previously returned step portion 210 of the lever 212 in an obvious manner. As the trigger 196 is returned to its at rest position, a push is exerted on the advancing link 226, the forward end of which engages a ratchet wheel 232, thereby advancing the cylinder 162 so as to position a subsequent cartridge chamber 160 in alignment with the firing pin 220. If so desired, a suitable guide bracket 234 can be provided for the link 226. In addition, it is contemplated that the trigger 196 be protected by an enlarged trigger guard 236.

In actual use, the appropriate wedge element 136 is engaged within the body 144 of the drive unit 146, the cartridges are placed within the cylinder 162, the handle 170 being pivoted open and the cylinder 162 locked against movement by the lip 190 on the handle locking lever 180, the handle is closed, and, upon engaging the wedge element 136 and a workpiece 138, the safety lever 224 is depressed and the trigger 196 squeezed so as to effect an explosion of one of the blank cartridges, with the discharged pressure being directed to the two wedge element studs or driver posts 140. Incidentally, it will be noted that small pressure release passages 238 are provided within the enlarged portions 190 of the stud passages 142 for release of the internal pressure after a driving of the wedge element. Subsequently, as the trigger 196 is released, the various elements are returned to their at rest positions and the cartridge cylinder is advanced so as to align another cartridge with the firing pin 220, thereby enabling a rapid and substantially continuous driving of the device 134.

Although not specifically illustrated, various changes can be made in the above described device which would be well within the scope of the basic invention involved herein. For example, the cylinder rotating link can be so orientated as to allow the firing pin to, in its at rest position, rest upon a spent cartridge, with the initial actuation of the trigger producing a rotation of the cylinder and a positioning of a new cartridge immediately prior to the actual firing of the cartridge. Further, if so desired, the means for retaining the studs 140 can be other than the remote controlled split collars in that it is highly unlikely that any situation would arise wherein the wedge element 136 would become so wedged within the workpiece as to not enable it to be easily released therefrom through the firing of one or more additional blank cartridges which can be easily loaded into the device from the upper end thereof. Incidentally, if so desired, the advancing rollers also need not be provided on the first described form of the invention, this depending mainly on the particular use to which the device is to be put. Further, if so desired, the basic drive unit, particularly the first described drive unit 24, can, through the provision of modified clamp means, be actually engaged with a wooden wedge of the type used in various construction operations so as to facilitate the driving or placing of such wedges.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hand power tool comprising a drive unit, a driven element, means releasably mounting said element on said unit for selective extension and retraction of said element relative to said unit, means within said drive unit for periodically imparting a driving force to said element for movement of the element within the limits allowed by the mounting means, a handle on said drive unit in opposed relation to said driven element, said driven element comprising an elongated wedge member and a pair of elongated spaced studs rigid therewith and projecting therefrom, limit means on said studs, said means mounting said element including a pair of passages within said drive unit slidably receiving said studs therethrough and said limit means therein, said means for periodically imparting a driving force to said element including means selectively and forcibly engaging the inner ends of said studs so as to effect an outward driving thereof, the means engaging the inner ends of said studs including a pair of cams, said cams being fixed on an elongated shaft extending through and rotatably mounted within said drive unit so as to periodically engage said inner ends upon a rotation of said shaft, and motor means operatively associated with said shaft for effecting a rotation thereof, said cams being oppositely directed on said shaft and alternately engageable with said studs so as to alternately drive the opposite ends of said elongated wedge member.

2. The tool of claim 1 wherein said stud retaining means includes a movable control for effecting a selective retention and release of said studs mounted on said unit, said means for imparting a driving force to said element including an off-on switch, said control being operatively connected with said switch for automatically moving said switch to the off position upon movement of the control so as to release the studs.

3. The tool of claim 2 wherein said retaining means includes a contractible split collar about the stud receiving end of each passage.

4. The tool of claim 3 wherein the movable control is mounted on said handle, and connecting means engaged between said control and the collars for effecting an operation of said collars in response to a manipulation of said control.

5. A hand power tool comprising a drive unit, a driven element, means releasably mounting said element on said unit for selective extension and retraction of said element relative to said unit, means within said drive unit for periodically imparting a driving force to said element for movement of the element within the limits allowed by the mounting means, a handle on said drive unit in opposed relation to said driven element, said driven element comprising an elongated wedge member having a pair of elongated spaced studs rigid therewith and projecting therefrom, limit means on said studs, said means mounting said element including a pair of passages within said drive unit slidably receiving the studs therethrough and said limit means therein, selectively closed means on said unit cooperating with said limit means for retaining the studs for limited movement within the passages, said means for periodically imparting a driving force to said element including means selectively and forcibly engaging the inner ends of said studs so as to effect an outward driving thereof, the means engaging the inner ends of said studs including a pair of cams, said cams being fixed on an elongated shaft extending through and rotatably mounted within said drive unit so as to periodically engage said inner ends upon a rotation of said shaft, motor means operatively associated with said shaft for effecting a rotation thereof, said cams being oppositely directed on said shaft and alternately engageable with said studs so as to alternately drive the opposite ends of said elongated wedge member, movable tool advancing means mounted on said drive unit and projecting laterally therebeyond for engagement with the workpiece, and means selectively operatively connecting said advancing means and said shaft for effecting a driving of the advancing means from the rotating shaft.

6. The tool of claim 5 wherein said means connecting said advancing means and said shaft includes a series of meshed gears, at least one of said gears being mounted for movement into and out of engagement with its associated gears, and means for selectively moving said movably mounted gear into and out of meshed engagement.

7. The tool of claim 5 wherein the movable tool advancing means comprises roller means mounted on opposed sides of said drive unit and projecting laterally therebeyond for rolling engagement with the opposed surfaces of a split being defined by the advancing wedge member.

8. The tool of claim 5 wherein said drive unit has opposed upwardly diverging sides constituting a general continuation of the configuration of the elongated wedge member for enabling a continuing movement of the tool into the split defined by the driven wedge member.

9. A hand power tool comprising a drive unit, an elongated driven wedge shaped element, means releasably mounting said element on said unit for limited movement relative thereto, said drive unit being shaped so as to define a wedge shaped continuation of the element, means within said unit for effecting a periodic powered driving of said element relative to said unit, and handle means on said drive unit.

10. The tool of claim 9 wherein the means mounting said element includes a pair of spaced studs projecting from said element and received within a first pair of passages within said unit, a second pair of passages converging from said first passages to a common central bore, a cartridge chamber on said unit communicating with said bore, and a triggering assembly mounted on said handle means for firing a cartridge within said chamber so as to effect a discharge of the explosive force thereof into said bore and through the passages against the element studs.

11. The tool of claim 10 wherein said handle means is mounted for movement toward and away from said drive unit, said cartridge chamber being defined in a rotatably mounted cylinder including a plurality of similar chambers, means for selectively rotating said cylinder so as to progressively position each chamber in communication with said bore, and lock means movable between a first position for selectively locking said handle means against movement and a second position preventing a firing of a cartridge.

12. The tool of claim 9 wherein said wedge shaped element and said drive unit define a pair of opposed downwardly converging sidewalls terminating in a wedge point, said drive unit overlying said wedge shaped element and including a substantially flat top, said handle means being mounted on said top and within the peripheral confines thereof.

13. A hand power tool comprising a drive unit, a driven element mounted on said drive unit and selectively driven thereby, said driven element having an elongated wedge shaped configuration so as to define a split in a workpiece being operated on by said tool, said drive unit being of a configuration so as to move into the split defined by the driven element, means mounted on said drive unit for engagement with a workpiece in a manner so as to advance the tool into the split defined by the driven element, and common means within said drive unit for driving said driven element and driving the means for advancing the tool.

14. A hand power tool comprising a drive unit, a driven element, means mounting said element on said unit for selective extension and retraction of said element relative to said unit, means within said drive unit for periodically imparting a driving force to said element for movement of the element within limits, a handle on said drive unit in opposed relation to said driven element, said driven element including an elongated wedge member having a pair of studs rigid therewith and projecting therefrom, said means mounting said element including a pair of passages within said drive unit slidably receiving said studs therein, said means for periodically imparting a driving force to said element including a pair of cams, said cams being fixed on an elongated shaft extending through and rotatably mounted within said drive unit so as to periodically engage the cams with the inner ends of the studs, said cams being oppositely directed on said shaft and alternately engageable with said studs so as to alternately drive the opposite ends of said elongated wedge member, motor means for effecting a rotation of said shaft, movable tool advancing means mounted on said drive unit and projecting laterally therebeyond for engagement with a workpiece, and means selectively operatively connecting said advancing means and said shaft for effecting a driving of the advancing means from the rotating shaft.

15. A hand power tool comprising a drive unit, a driven element, means releasably mounting said element on said unit for selective extension and retraction of said element relative to said unit, means within said drive unit for periodically imparting a driving force to said element for movement of the element within limits, a handle on said drive unit in opposed relation to said driven element, said driven element including an elongated wedge member having a pair of elongated studs rigid therewith and projecting therefrom, said means mounting said element including a pair of passages within said drive unit slidably receiving said studs, a bore in said drive unit in opposed relation to said passages and centrally therebetween, passage means communicating said passages with said central bore, the means for periodically imparting a driving force to said element including a blank cartridge receiving chamber, and means for effecting a firing of a cartridge within the chamber in a manner so as to effect a discharge of the explosive force thereof into said bore, through said passage means and against the inner ends of said studs, thereby effecting an outward driving of the studs and the element.

16. A hand power tool comprising a drive unit, an elongated wedge-shaped driven element, means releasably mounting said element on said unit for selective extension and retraction relative thereto, means within said drive unit for periodically imparting a driving force to said element for movement of the element within predetermined limits, a handle on said drive unit in opposed relation to said driven element, and means on said handle for effecting a release of the means mounting said element remote from said element.

References Cited
UNITED STATES PATENTS

| | | | |
|---|---|---|---|
| 1,001,903 | 8/1911 | Temple | 173—51 X |
| 1,606,253 | 11/1926 | McColgan | 144—193 X |
| 2,226,559 | 12/1940 | Groom | 173—123 X |
| 2,884,842 | 5/1959 | Schmitz | 173—123 X |
| 3,055,343 | 9/1962 | Kurt | 173—152 X |
| 3,128,653 | 4/1964 | Service et al. | 60—26.11 X |
| 3,160,217 | 12/1964 | Raihle | 173—123 X |

FRED C. MATTERN, JR., *Primary Examiner.*

L. P. KESSLER, *Assistant Examiner.*